(12) United States Patent
Dominguez (10) Patent No.: US 9,790,655 B1
(45) Date of Patent: Oct. 17, 2017

(54) SYSTEM AND METHOD OF STABILIZING SOIL

(71) Applicant: POLYMER TECHNOLOGIES WORLDWIDE, INC., Tampa, FL (US)

(72) Inventor: Yamil Dominguez, Tampa, FL (US)

(73) Assignee: Polymer Technologies Worldwide, Inc., Tampa, FL (US)

( * ) Notice: Subject to any disclaimer, the term of this patent is extended or adjusted under 35 U.S.C. 154(b) by 0 days.

(21) Appl. No.: 15/082,961

(22) Filed: Mar. 28, 2016

(51) Int. Cl.
*E02D 3/02* (2006.01)
*E02D 3/12* (2006.01)
*C09K 17/48* (2006.01)

(52) U.S. Cl.
CPC ............. *E02D 3/12* (2013.01); *C09K 17/48* (2013.01); *E02D 2300/0023* (2013.01); *E02D 2600/10* (2013.01)

(58) Field of Classification Search
CPC .......... B65D 81/3211; E02D 3/00; E02D 3/12
USPC ...................... 405/263, 266, 267, 269, 302.4
See application file for complete search history.

(56) References Cited

U.S. PATENT DOCUMENTS

| | | | | |
|---|---|---|---|---|
| 2004/0071512 A1* | 4/2004 | Muhlbaier | ............... | E02D 3/08 405/267 |
| 2009/0155002 A1* | 6/2009 | Hakkinen | ............... | E02D 3/12 405/263 |
| 2009/0304457 A1* | 12/2009 | Shimada | ............... | C09K 17/06 405/269 |
| 2011/0280669 A1* | 11/2011 | Moroschan | ............ | B65D 25/08 405/271 |
| 2012/0207552 A1* | 8/2012 | Masloff | ................... | E21B 43/28 405/263 |

\* cited by examiner

*Primary Examiner* — Tara M. Pinnock
(74) *Attorney, Agent, or Firm* — Sanchelima & Associates, P.A.; Christian Sanchelima; Jesus Sanchelima (57) ABSTRACT

The present disclosure discloses a system and a method for injecting a composition into soil. The composition is passed under pressure into a filler tube housed within an expandable element situated in a first hole. When the composition is pumped, therein the filler tube is raised and, the expandable element expands when the composition fills the expandable element, thereby solidifying the adjacent soil. Further, due to expansion, the structure above the ground is lifted. The rate of pumping the composition into the filler tube is determined by pressure of the composition, the type of soil, or by the chemical reaction detected by a first sensor and/or a second sensor present in a second or third hole. The material injected into the ground improves the soils beneath a structure, such as a house to create a resistance once the material permeates the soil and expands.

13 Claims, 6 Drawing Sheets

SYSTEM AND METHOD OF STABILIZING SOIL

FIELD OF INVENTION

The present disclosure relates to a filed of injecting a composition into soil. More specifically, the present disclosure relates to an arrangement and a method of injecting a composition into an expandable element in the soil.

BACKGROUND

As known, earth is the structural foundation support for houses, buildings and other structures. It is well know that strength and support of the surface of the earth changes due to geological changes. As a result, the structures that may have been built on a solid surface, may at a later date become instable, which can lead to severe property damage or even the collapse of structures that have been build there.

There could be various reasons that cause soil instability. For example, the soil instability may be caused by an earthquake, poorly consolidated soil, water-induced erosion, inappropriate soil type during construction, or variations in temperature or humidity conditions. In addition, the soil instability may be caused by changes in conditions due to mechanical damage, such as breakage of water or sewer pipes.

In order to improve the foundational support strength and characteristics of soils, civil engineers are using modern construction practices. In other words, the civil engineers are using modern construction practices to improve soil and/or lifting the structures. In order to improve the soil and to lift the structures, one such solution provided includes injecting a material into soil that expands as a consequence of a chemical reaction. Injection typically requires drilling a hole in the ground. After the hole is made, the material is injected into the hole under high pressure. An amount of the material to be injected may be determined by examining the properties of the soil. The sufficiency of the material to be injected is checked by periodically measuring the properties of the soil. However, such a process for determining the amount of the material to be injected is slow and unreliable. Further, the material used to inject into the soil is does not provide the required strength to support the structural load. Also, currently compositions used to expand react too quickly and many times solidify before making their way to the required location in the soil.

SUMMARY

The above-mentioned unsolved problems are addressed by providing an arrangement and a method of injecting a material, which expands as a consequence of an efficient chemical reaction into the soil.

In one aspect of the present disclosure, a method of improving soil condition and/or lifting a structure is disclosed. At first, a first hole is drilled in soil. Subsequently, a first pipe having a cap positioned in its bottom distal end is inserted into a first hole. Further, in proximity to the first hole, a second hole is drilled. Further, sensors, e.g., a first sensor and a second sensor are inserted into the second hole. The first sensor and second sensor are used to collect information of the soil in real-time. In the first pipe, a filler tube is inserted into the expandable element. Further, the expandable element is inserted into the first pipe. The filler tube allows a composition to be injected therein and then into the expandable element at a controlled depth. Subsequently, the first pipe is retracted from the first hole. After retracting the first pipe, the expandable element remains in the first hole and the cap remains buried in the soil since it is removably mounted to the first pipe. Subsequently, a composition is filled under pressure using the filler tube into the expandable element. The filler tube in the first pipe is lifted to allow the composition to flow out of it and into the expansion element. This pressure of the composition pushed into the expansion element is what causes it to expand. The rate of lifting of the filler tube is determined by pressure used to pump the composition, by the specifications for a particular job site, or by the chemical reaction detected by the first sensor and or second sensor. When the composition expands 3% or less it is referred to as permeating while an expansion greater than 3% is referred to as expandable. Expansion element 110 is always expanded when filled by the composition 114. If expansion element is not expanded it typically means that the pump that fills it with composition 114 is not working properly or the soil is too hard.

In another aspect of the present disclosure, an additional hole i.e., a third hole is drilled in proximity to the first hole. In the current aspect, the first sensor is inserted into the second hole and a second sensor is inserted into the third hole to increase the precision of the system.

In yet another aspect of the present disclosure, the second pipe, comprising hoses is inserted into the first pipe to inject the composition into the soil.

The features and advantages described in this summary and in the following detailed description are not all-inclusive, and particularly, many additional features and advantages will be apparent to one of ordinary skill in the relevant art, in view of the drawings, and specification thereof. Moreover, it should be noted that the language used in the specification has been principally selected for readability and instructional purposes, and may not have been selected to delineate or circumscribe the inventive subject matter.

BRIEF DESCRIPTION OF DRAWINGS

In the following drawings, like reference numbers are used to refer to like elements. Although the following figures depict various examples of the invention, the invention is not limited to the examples depicted in the figures.

DETAILED DESCRIPTION

In the present disclosure, relational terms such as first and second, and the like, may be used to distinguish one entity from the other, without necessarily implying any actual relationship or order between such entities. The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a system and a method of improving soil condition and/or lifting a structure. In one example, a first hole is drilled in soil. After drilling the first hole, a first pipe having a cap is inserted into the soil. Further, in proximity to the first hole, a second hole is drilled. Further, at least one sensor, e.g., a first sensor and a second sensor are inserted into the second hole. The first sensor and second sensor are used to collect information about the soil. Further, a filler tube 112 is housed within the expansion element 110 that is inserted into first pipe 106. The filler tube allows a composition to be injected into the expandable element at a controlled depth. Subsequently, the first pipe is retracted from the first hole. After retracting the first pipe, the expandable element remains in the first hole and the cap is separated from the first pipe. Subsequently, a composition is pushed under pressure using the filler tube into the expandable element. The filler tube is then lifted while filing the composition is released into the expansion element. The rate of lifting of the filler tube is determined by pressure of the composition or by the chemical reaction detected by the first sensor and or second sensor or by an engineer. This process can be repeated in the non-encapsulated embodiment wherein the composition 114 is injected directly into the soil. The material injected into the ground improves the soil beneath a structure, such as a house, by creating a resistance once the material permeates the soil, solidifies the soil directly or expands and solidifies the soil. In one embodiment, composition 114 may not expand, or expand 3% or less, upon getting into contact with its other components and/or the soil. In another embodiment, composition 114 may expand more than 3% upon getting into contact with its other components and/or the soil. The various embodiments for improving soil condition and/or lifting a structure are explained in conjunction with the description of FIGS. 1-5, further described below using numerals to identify components in the system and its alternate embodiments.

Figure 1:
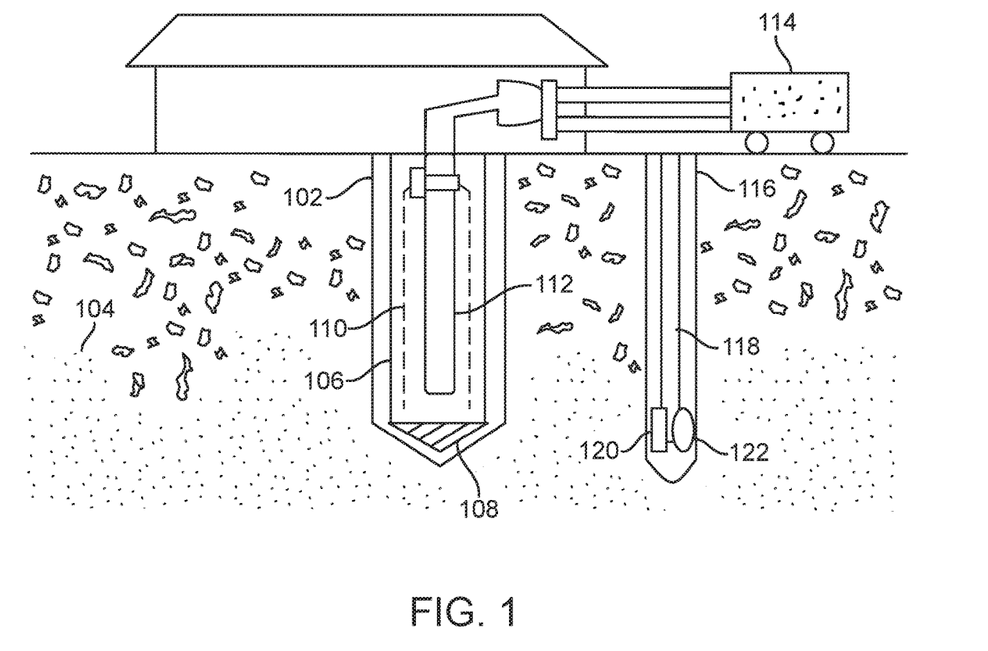
FIG. 1 illustrates a system for improving soil condition, in accordance with one embodiment of the present disclosure. Specifically, cap 108 is shown at the bottom of distal end of first pipe 106, both of which have already been inserted a predetermined distance into soil 104, and the composition is injected into the expansion element 110, this embodiment is known as "encapsulated".

Referring to FIG. 1, a system for improving soil condition and or lifting a structure is shown, in accordance with one embodiment of the present disclosure known as encapsulated. The term encapsulated refers to composition 114 being used within expandable element 110. The term non-encapsulated refers to composition 114 being injected into the soil without the use of expansion element 110. At first, a first hole 102 is drilled in soil 104. In one implementation, the first hole 102 may be drilled through a foundation of a structure such as a house or next to the foundation. The first hole 102 may be drilled using a hydraulic system, air system, power system, water pump and so on depending upon condition of the soil and the depth required. In one example, the first hole 102 may be drilled at an angle of 90 degrees with respect to the surface of the ground. In another example, the first hole 102 may be drilled at an acute angle from the surface of the ground. After drilling the first hole 102, a first pipe 106 is inserted into the first hole 102. The first pipe 106 is terminated on the bottom distal end by a cap 108. In the first pipe 106, an expandable element 110 is inserted. In one example, the expandable element 110 may be made up of a permeable or resin material. Further, the expandable element 110 comprises a filler tube 112. In other words, the filler tube 112 is inserted into the expandable element 110. The filler tube 112 is used to deliver a composition 114 into the expandable element 110. The expandable element or otherwise known as the expansion element 110 can be made of a polyurethane, fiber or rubber. Expansion element 110 can be permeable or impermeable.

Subsequently, the first pipe 106 is retracted from the first hole 102 such that the expandable element 110 remains in the first hole 102, and the cap 108 remains in place at the bottom of the expandable element 110. In one embodiment first pipe 106 can be flexible. When composition 114 uses expansion element 110 the sensors will monitor the composition's reaction and the expansion of the expansion element. When composition 114 is added directly into the soil without the use of expansion element 110 the sensors are used to monitor the migration of composition 114.

Further, in proximity to the first hole 102, a second hole 116 is drilled. In one example, the second hole 116 is drilled in parallel to the first hole 102. The second hole 116 may be drilled using a hydraulic system, air system, power system, water pump and so on depending upon condition of the soil and the depth required. After drilling the second hole 116, a second pipe 118 is inserted into the second hole 116. The second pipe 118 at one end or proximity to the end may comprise at least one sensor. In one example, the second pipe 118 may comprise two or more sensors. For example, the second pipe 118 may comprise a first sensor 120 and a second sensor 122. In one example, the first sensor 120 may be a camera. Specifically, the first sensor 120 may be a borehole camera. In one example, the second sensor 122 may be a level sensor. Specifically, the second sensor 122 may comprise a theodolite. The functioning of the various components mentioned herein is explained in the following description. Sensors 120 and 122 can be lowered and raised within first or second hole 102; 116 to better monitor the reaction of composition 114 or migration of said composition and/or expansion of expansion element 110.

In operation of one embodiment, the composition 114 (stored in a container) is pumped in units, gallons, pounds, strut, or cubic yards through the filler tube 112 into the expandable element 110. In one example, the composition 114 is a an epoxy/resin mixture. The terms epoxy and resin are used interchangeably and will be referred to as the epoxy/resin mixture. The epoxy/resin mixture can be single component or two component. Two components includes Resin component A and Resin component B that can react when combined. In another example, the composition 114 comprises an epoxy/resin mixture and grout, such as a cement grout. In another example, the composition 114 comprises an epoxy/resin mixture and sand. In another example, the composition 114 comprises an epoxy/resin mixture and any type of soil. The composition 114 used is based on the condition of the soil. When the composition 114 is pumped under pressure, the composition 114 begins to expand the expandable element 110, as the filler tube 112 is raised. Due to fill and the pressure, the expandable element 110 expands. Further, the composition 114 when used as two component reacts when Resin component A and B react and solidifies in the expandable element. In one implementation, the expandable element 110 used may expand using the above mentioned fill pressure and the composition 114 may expand only up to 3% within expandable element 110. In another implementation, the expandable element 110 used may expand using the above mentioned fill pressure and the composition 114 may expand more than 3% of its original dimension within expansion element 110 The amount of reaction needed depends on the soil. In one example, the composition 114 includes at least one of resin, polyurethanes, or combination, thereof may be heated before being pumped through filler tube 112. The composition 114 may be heated depending upon the type of the combination used in the composition.

When the composition 114 is being released to fill the expandable element 110, the first sensor 120 monitors the amount of the fill and the second sensor 122 monitors level of fill. Further, when the expandable element 110 expands, the structure above the ground is elevated. Data such as the amount and level may be communicated through the second hole 116 to a device (not shown) operated by a user. Based on the data, the user may manage the pressure at which the composition 114 is pumped into the filler tube 112. The expansion element 110 expands to cooperate with softer pockets in the soil, thereby, creating a support column underground. The pressure that composition 114 can be pushed directly into the ground or into expansion element 110 can be 2000 psi.

After the composition 114 is injected into the ground, the composition 114 improves the soil beneath the structure to create a resistance once the composition 114 permeates the soil and expand with the end result to fill any gaps or soft/weak pockets in soil 104. In other words, upon injection, the composition 114 creates a stone or rock type material that supports the structural load of the structure, such as a house. In one embodiment, the composition 114 injected permeates the soil 104 and solidifies or permeates the soil 104 and expands by less than 3%. When the expansion is 3% or less it is known as permeation. When the expansion is greater than 3% the reaction and/or composition is known as expandable. It should not be noted that the composition 114 injected may or may not expand; and the reaction depends on the condition of the soil 104 as can be determined by sensors 120;122 and/or engineers. In one example, the composition 114 may expand more than 3% and may further expand by more than 50%, and is not limited to the range specified above. Further, the arrangement explained above may be used to lift the structure in a consistent and permanent remediation with the help of the first sensor and the second sensor. A catalyst component can be added to composition 114 that can make it expand slower or faster. The catalyst component can be added to single or two component formulations.

Figure 2A:
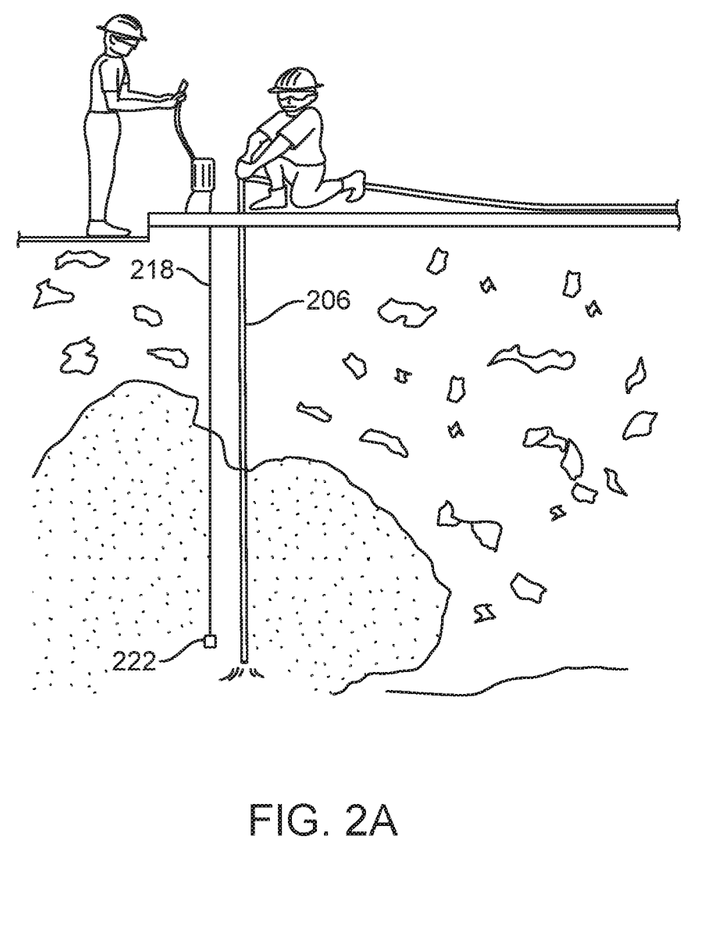
FIGS. 2A and 2B illustrate an alternate embodiment known as "non-encapsulated" is used wherein a first pipe and a second pipe being used without predrilling a hole, and the composition is injected into the soil, in accordance with one exemplary embodiment of the present disclosure.
Figure 2B:
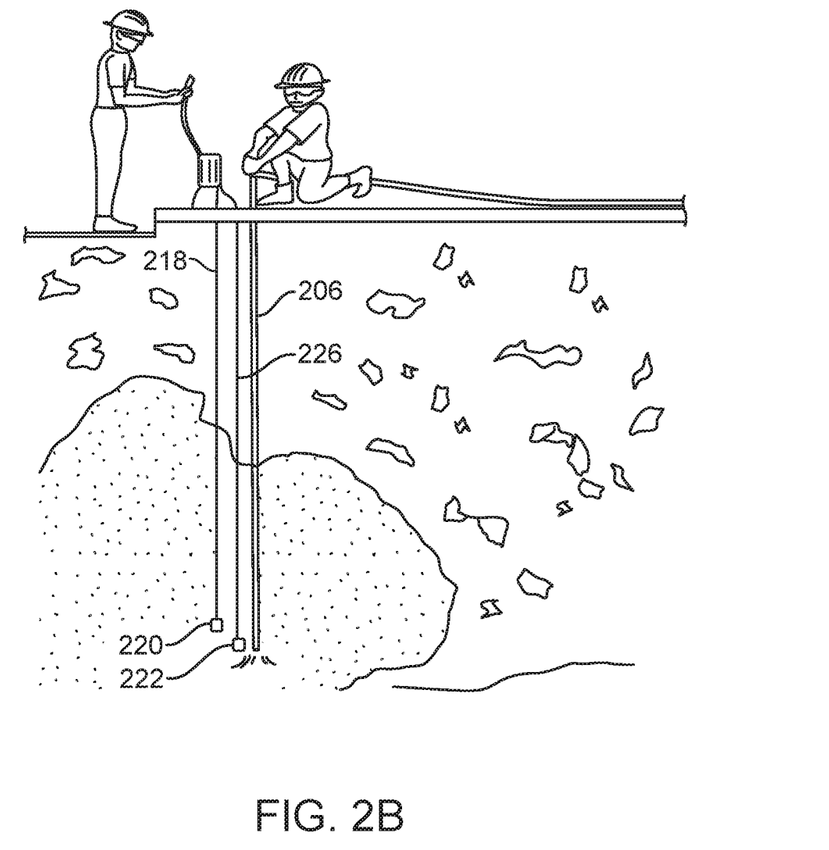

The first hole and the second hole may be drilled to any depth, for example from 2 feet to more than 120 feet to insert the first pipe and the second pipe based on the requirement such that the composition is filled in the expandable element. Referring to FIG. 2A, usage of a first pipe 206 and a second pipe 218 being used at greater depth is shown, in accordance with one exemplary embodiment of the present disclosure. Further, size of the first pipe may be in the range of 1/16 inch to 5 inches, however, the size of the first pipe is not limited to the range specified herein. The second pipe 218 may have first and second sensors 220; 222 at one end to sense the level of composition being filled in the soil. Referring to FIG. 2B, usage of a first pipe 206, a second pipe 218 and a third pipe 226 being used at greater depth is shown, in accordance with another exemplary embodiment of the present disclosure. The second pipe 218 may have a first sensor 220 such as a camera at bottom end to show the amount of composition being filled in the soil. Further, the third pipe 226 may have a second sensor 222 at bottom end sense the level of composition being filled in the soil. The data from the first sensor 220 and the second sensor 222 may be sent to a medium above ground (as shown in FIG. 2B) to view and control the pumping of the composition by a user. The rate of expansion can be controlled by the types of Resin A and B components used when the two component formulation is used or by the type of single component Resin that is used. The rate can be further controlled by the psi used to pump composition 114. The type of catalyst component used also increases or decreases the acceleration of the reaction of the composition and thus the expansion of the expansion element when an expansion element is used. Although the figures show two sensors being employed, it should be understood that more than two sensors may be used to provide proper guidance or orientation to perform the above procedure. FIGS. 2A and 2B both show non-encapsulated embodiments.

In this embodiment, the first pipe 206 is raised as it releases the composition 114. In the present embodiment, the arrangement does not comprise the expandable element. However, the composition 114 is injected directly into the first pipe 206 and into the soil 104.

In operation, the retraction of the first pipe 206 and the injection of the composition 114 are controlled by the data received from the first sensor 220 and the second sensor 222. Specifically, speed of the retraction of the first pipe 206 and the injection of the composition 114 are controlled based on the condition of the soil 104 and the information such as reaction time of the composition with the soil, collected by the first sensor 220 and the second sensor 222. In other words, the speed of retraction of the first pipe 206 is controlled based on the pressure of the composition 114 being injected or the chemical reaction as detected by the first sensor 220 and the second sensor 222. The composition 114 injected permeates the soil 104 and solidifies or permeates the soil 104 and expands by more than 3%. It should not be noted that the composition 114 injected may or may not expand; and the reaction depends on the condition of the soil 104. In one example, the composition 114 may expand more than 3% and may further expand to more than 50%, and is not limited to the range specified above.

Figure 3:
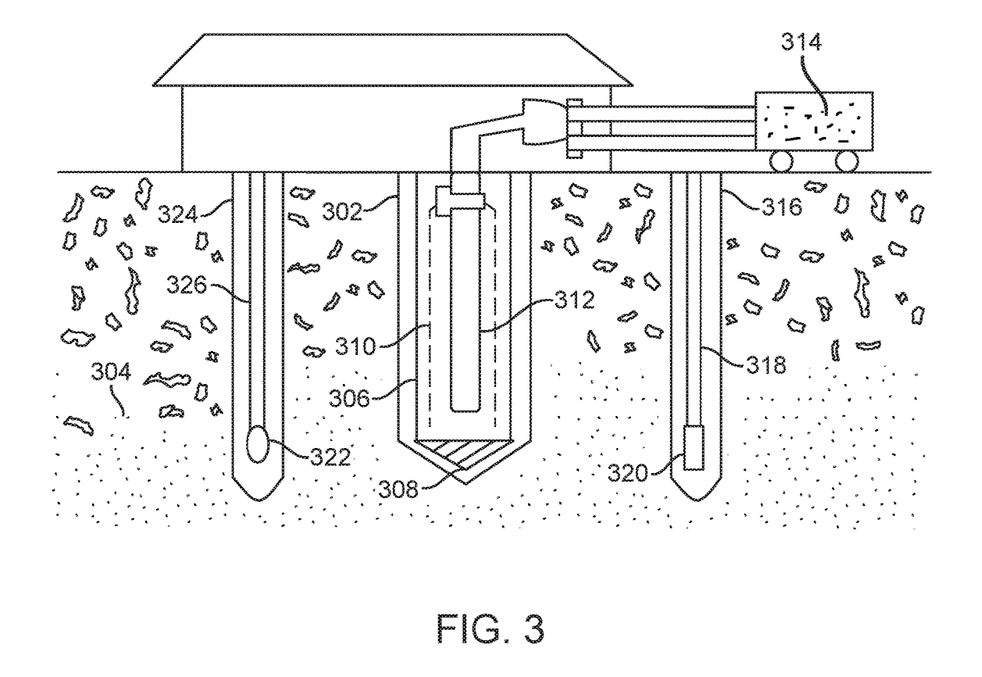
FIG. 3 illustrates an arrangement showing two or more holes for sensors used to control the injection of the composition, in accordance with another embodiment of the present disclosure.

Referring to FIG. 3, a system for improving soil condition and or lifting a structure is shown, in accordance with another encapsulated embodiment of the present disclosure. At first, a first hole 302 is drilled in soil 304. In one implementation, the first hole 302 may be drilled through a foundation of a structure such as a house or next to the foundation. In one example, the first hole 302 may be drilled at an angle of 90 degrees from the surface of the ground. In another example, the first hole 302 may be drilled at an acute angle from the surface of the ground. After drilling the first hole 302, a first pipe 306 is inserted into the first hole 302. The first pipe 306 is terminated on the downward end by a cap 308. In the first pipe 306, an expandable element 310 is inserted. In one example, the expandable element 310 is made up of a resin or polyurethane material or other components. Further, the expandable element 310 houses a filler tube 312. In other words, the filler tube 312 is inserted into the expandable element 310. The filler tube 312 is used to deliver a composition 314 into the expandable element 310.

Subsequently, the first pipe 306 is retracted from the first hole 302 such that the expandable element 310 remains in the first hole 302 and the cap 308 remains in place at the bottom of the expandable element 310.

Further, in proximity to the first hole 302, two or more holes are drilled. For the purpose of explanation, the present embodiment is explained using two additional holes in proximity to the first hole 302, however, it should be understood that more than two holes might be drilled in addition to the first hole 302. Referring to FIG. 3, in proximity to the first hole 302, a second hole 316 is drilled. The second hole 316 can be drilled in parallel to the first hole 302. After drilling the second hole 316, a second pipe 318 is inserted into the second hole 316. The second pipe 318 at one end or proximity to the end may comprise a first sensor 320. In one example, the first sensor 320 may be a camera. Specifically, the first sensor 320 may be a borehole camera. Similarly, in proximity to the first hole 302, a third hole 324 is drilled. The third hole 324 can be drilled in parallel to the first hole 302. After drilling the third hole 324, a third pipe 326 is inserted into the third hole 324. The third pipe 326 at one end or proximity to the end may comprise a second sensor 322. In one example, the second sensor 322 may be a level sensor. Specifically, the second sensor 322 may comprise a theodolite.

When the composition 314 enters expandable element 310, the first sensor 320 monitors the amount of the fill and the second sensor 322 monitors level of fill. Further, when the expandable element 310 expands, the structure above the ground can be elevated or lifted and the ground is stabilized. Data such as the amount and level may be communicated through cables the second pipe 318 and the third pipe 326, respectively to a device (not shown) operated by a user. Otherwise, Bluetooth or Wi-Fi can be used to transmit the data. Based on the data, the user may manage the pressure at which the composition is pumped into the filler tube 312.

Figure 4:
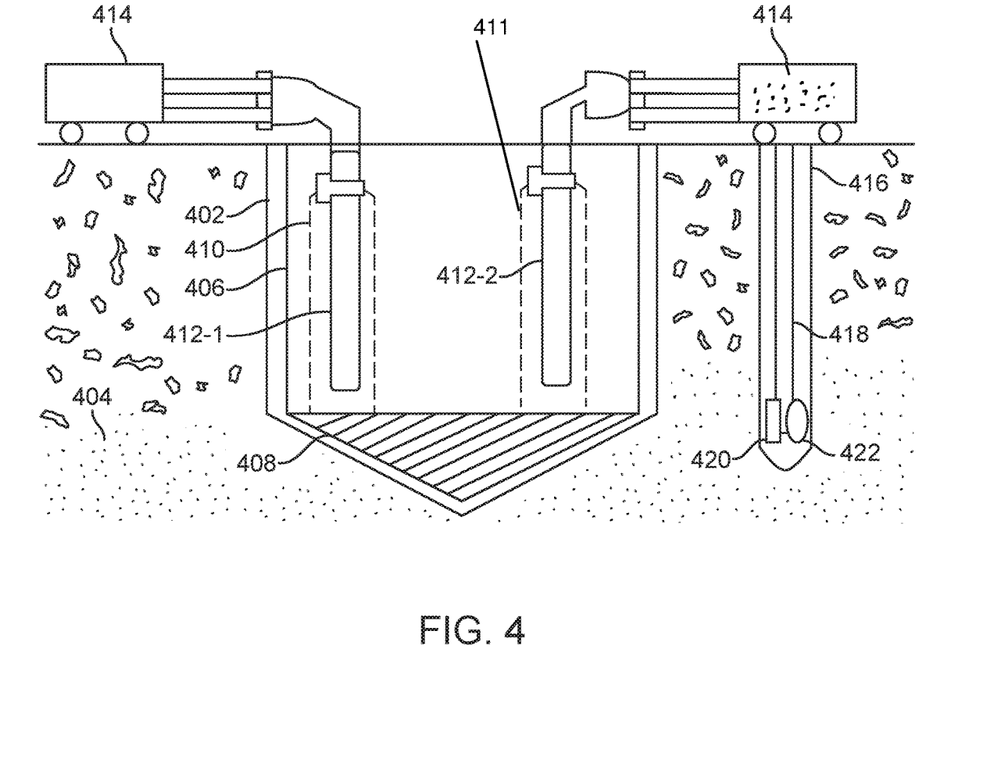
FIG. 4 illustrates another alternate embodiment showing at least two materials being injected into the soil from two separate sources into two expansion elements, in accordance with another embodiment of the present disclosure.

Referring to FIG. 4, a system for improving soil condition and/or lifting a structure is shown, in accordance with another embodiment of the present disclosure. At first, a first hole 402 is drilled in soil 404. In one implementation, the first hole 402 may be drilled through a foundation of a structure such as a house or next to the foundation. In one example, the first hole 402 may be drilled at an angle of 90 degrees from the surface of the ground. In another example, the first hole 402 may be drilled at an acute angle from the surface of the ground. After drilling the first hole 402, a first pipe 406 is inserted into the first hole 402. The first pipe 406 is terminated on the downward end by a cap 408. In the first pipe 406, an expandable element 410 is inserted. In one example, the expandable element 410 is made up of a resin, polyurethane material fiber, rubber, or any combination thereof. Further, the expandable element 410 comprises a first filler tube 412-1, and a second filler tube 412-2, is housed within second expandable element 411. The filler tubes 412-1, 412-2, collectively referred to as 412, are used to deliver a composition 414 comprising of two different material, for example, an epoxy/resin mixture into the expandable elements 410;411. It is to be understood that only one expandable element may be used to receive the composition (from two filler tubes) or an expandable element may be provided for each respective filler tube if multiple filler tubes are used, depending upon the condition of the soil. Subsequently, the first pipe 406 is retracted from the first hole 402 while cap 408 remains buried, such that the expandable elements 410;411 remain in the first hole 402 and the cap 408 remains in place at the bottom of the hole 402.

Further, in proximity to the first hole 402, a second hole 416 is drilled. The second hole 416 is drilled in parallel to the first hole 402. After drilling the second hole 416, a second pipe 418 is inserted into the second hole 416. The second pipe 418 at one end or proximity to the end may comprise a first sensor 420 and a second sensor 422.

When the composition 414 enters through the first filler tube 412-1 and the second filler tube 412-2, both filler tubes are raised at predetermined rates of speed. The first sensor 420 monitors the amount of the fill and the second sensor 422 monitors level of fill. Further, when the expandable elements 410;411 expand, the structure above the ground is elevated or lifted. Data such as the amount and level may be communicated through cables in the second pipe 418 to a device (not shown) operated by a user. Based on the data, the user may manage the pressure at which the composition 414 is pumped into respective filler tubes 412.

Figure 5A:
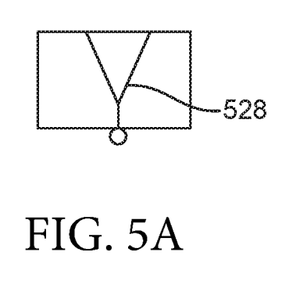
FIG. 5A illustrate other alternate embodiments wherein Y-mixer 528 is implemented to mix the components of the composition before they are released into the expansion element as the filler tube is raised.
Figure 5B:
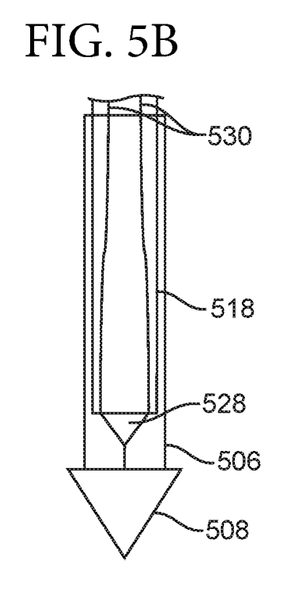
FIG. 5B illustrate other alternate embodiments wherein Y-mixer 528 is implemented to mix the components of the composition before they are released into the expansion element as the filler tube is raised.
Figure 5C:
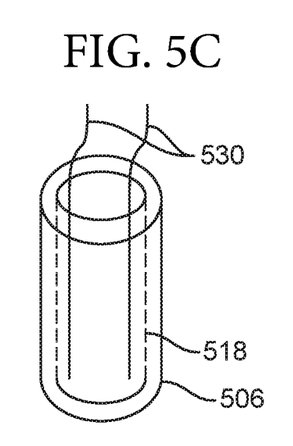
FIG. 5 shows an alternate embodiment wherein the components are individually released into the filler tube.

Referring to FIG. 5, a system and method for injecting a composition is shown, in accordance with another embodiment of the present disclosure. The system comprises a first pipe 506 terminated on the downward end by a cap 508, to protect the first pipe 506 from entering soil or debris. The first pipe 506 comprises an expansion element 518 having a smaller diameter than the first pipe 506. The filler tube housed within expansion element 518 in this embodiment can have Y-mixer 528 at its bottom distal end. Multiple hoses 530 are located within the filler tube and are used to carry the composition through the filler tube. This allows the present invention to be used with deeper distances since the separate reactive components of the composition can travel further down before they react. These components can include Resin component A and Resin component B that travel through separate hoses and only mix deep in the soil in Y-mixer 528. The Y-mixer can be implemented at the bottom end of the filler tube with or without the expansion element 518. Instead of Y-mixer 528, the system can use two hoses 530 to deliver the composition separately through a filler tube and into the soil.

The embodiments shown in FIGS. 5A and 5B allow first pipe 506 and expansion element 518 to go deeper into the soil, without mixing the materials until they are out of the respective hoses and combined in Y-mixer 528. The different materials may be pumped through a single hose or separately into the second hose. Y-mixer 528 can include a third hose for a third material to be mixed therein. The different materials pumped may react only once they reach the Y mixer 528. The above arrangement allows controlling reaction of the soil either slowly or fast in any type of soil and at any depth. Further, the different materials may be pumped at separate intervals to initiate the reaction of the different materials upon mixing in the Y mixer 528. The pipes and hoses used may include one of a plastic, rubber, pvc and metal.

In one implementation, at first, the cap 508 is installed in the ground at the desired depth, e.g., 100 feet after drilling a hole. Subsequently, the first pipe 506 is hammered into the ground. Further, the hoses 530 present in the expansion element 518 may be connected to the Y mixer 528. The hoses 530 are taken in such a way that the length of the hoses 530 is substantially same as the expansion element 518. In one example, an epoxy/resin mixture may be pumped into one hose and a grout may be pumped into another hose within the same filler tube and having Y-mixer 528 at its bottom end or only hoses 530 within the filler tube. After pumping, the Y mixer 528 receives different materials through openings at one end and mixes the different materials. Upon mixing the different materials, the Y mixer 528 delivers the mixture onto the bottom of the opening. The amount of the materials injected in the soil may be monitored using sensors (first sensor and second sensor as explained above) to control the pumping of the different materials. In other words, speed of the injection of the materials may be controlled using the sensors. Specifically, the injection of the different materials is controlled based on the condition of the soil and the information collected, such as the chemical reaction as detected by the sensors. After injecting the mixture into the soil, the Y mixer 528 may be raised through the expansion element 518.

In another implementation, at first, the first pipe 506 may be introduced into the ground along with the cap 508. Subsequently, a plurality of hoses 530 may be provided inside the expansion element 518 or outside of it. In the present implementation, the arrangement does not comprise Y mixer 528. In other words, the hoses 530 inside or outside the expansion element 518 run the length of the first pipe 506.

After connecting the first pipe 506, the expansion element 518, and the hoses 530, composition may be injected separately through the hoses 530. The composition injected separately through the hoses 530 is delivered into the first pipe 506 and into the soil. While the composition is being injected into the soil, the first pipe 506 is raised, thereby leaving the cap 508 at the bottom. The speed of retraction of the first pipe 506 and the injection of the composition separately is controlled based on the pressure of the composition being injected or the chemical reaction as detected by the sensors (described above). As evident from the description, different materials may be pumped through different hoses. For example, a 3-part epoxy/resin mixture may be pumped into one hose and a grout may be pumped into another hose. The composition injected gets accumulated in the soil. Further, the composition may react with the soil and/or other composition when gets into contact. The chemical reaction and the amount of the composition being injected may be controlled using the information collected by the sensors, inserted in the second hole. Further, the speed at which the composition is pumped and the speed of retracting the first pipe 506 is controlled using the sensors.

An encapsulating method to stabilize soil including:
j. Drilling a first hole into the soil under a structure;
k. Inserting a first pipe into said first hole, said first pipe having a removable cap at its bottom end;
l. Drilling a second hole into the soil under a structure and adjacent to said first hole, inserting at least one sensor into said second hole;
m. Inserting an expansion element into said first pipe, said expansion element including a filler tube housed therein;
n. Pumping a composition into said filler tube;
o. Raising said first pipe out of said soil;
p. Raising said filler tube within said expansion element thereby allowing said composition to be released into said expansion element, thereby expanding said expansion element;
q. Monitoring said expansion and solidification of said expansion element using said at least one sensor;
r. Completely removing said filler tube out of said expansion element, thereby leaving said removable cap and expanded expansion element in said soil.

The non-encapsulating method to stabilize soil includes:
g. Drilling a first hole into the soil under a structure;
h. Inserting a filler tube into said first hole, said filler tube having a removable cap at its bottom end;
i. Drilling a second hole into the soil under a structure and adjacent to said first hole, inserting at least one sensor into said second hole;
j. Raising said filler tube to be removed from said cap;
k. Pumping a composition into said filler tube allowing said composition to be released into said soil;
l. monitoring said expansion and solidification of said composition using said at least one sensor;
Completely removing said filler tube out of said soil, thereby leaving said removable cap in said soil.

The above arrangement allows controlling reaction of the soil either slowly or fast in any type of soil and at any depth. Further, the different materials may be pumped at separate intervals to initiate the reaction of the different materials when they reach the soil.

It is to be noted that the above embodiments are provided for illustrative purpose and should not be construed to limit to the embodiments explained, but the present disclosure is applied for any improving soil condition and/or to lift the structures. Further, the dimensions of the first pipe, second pipe, hoses and other components may vary depending on the implementation of the present disclosure and the ranges specified in the specification is not restricted to the embodiments presented.

The composition comprising of various materials may be used depending upon the condition of the soil and the structure. The composition improves the soil beneath the structure such as house, building, to create a resistance once the composition permeates the soil. Further, the composition may also be injected into a pile that does not permeate the soils such that the pile creates a column or pile to support the structural load.

In addition, sensors such as lasers and any other equipment may be used to monitor the lifting and/or variation of the existing levels that are being injected or used at the time. In an alternate embodiment, the filler tubes in the above-mentioned embodiments can include a plurality of through-holes that allow the composition to flow out of the through-holes. In an alternate embodiment the composition can be pumped directly into the ground using at least one hose. This embodiment does not use the expansion element. This embodiment can be implemented with the Y-mixer so that various components such as Resin component A, Resin component B, sand, soil, cement grout, or a combination thereof can each have their independent hose. This allows the components to travel deeper before reacting instead of a two component formulation using Resin components A and B, a single component can be used in combination with sand, soil, and/or cement grout. It can also be used by itself further a catalyst component can be used with either the single or two component formulation. The catalyst can be used with or without the expansion element.

In the preceding specification, the present disclosure is described with reference to the specific embodiments. However, it will be apparent to a person with ordinary skill in the art that various modifications and changes can be made, without departing from the scope of the present disclosure. Accordingly, the specification and figures are to be regarded as illustrative examples of the present disclosure, rather than in restrictive sense. All such possible modifications are intended to be included within the scope of present disclosure.

An encapsulating system to stabilize soil comprising a first pipe having a bottommost distal end and adapted to be drilled into soil through a first hole at a predetermined location adjacent to or underneath a structure and to a predetermined depth, an expansion element housed within said first pipe, said first pipe having a removable cap positioned at its bottommost distal end, a filler tube having a top and bottom end and housed within the expansion element, a composition that is pumped into said filler tube through said top end, said composition pumped into said filler tube's top end at a predetermined injection speed and fill amount, said expansion element expanding as said composition fills it, at least one sensor that is inserted into said soil through a second hole drilled into said soil adjacent to said first hole, said composition includes a component combination of sand, a reaction-changing substance, cement grout, soil, and/or at least one type of resin; a plurality of hoses housed within said filler tube are used to transport each component that makes up said composition; a Y-mixer used to receive different components from said plurality of hoses as they exit said filler tube; said components being combined in said Y-mixer.

What is claimed is:

1. A non-encapsulating system to stabilize soil including a first tube having a bottom distal end and drilled into the soil under a given structure, a removable cap located at said bottom distal end, at least one sensor inserted into the soil adjacent to said first tube, a filler tube inserted into said first tube, at least one hose housed within said filler tube, a composition pumped into said at least one hose, said first tube being raised from its position and leaving said cap in the ground, said composition including at least one composition component that is released into said soil through the bottom of said filler tube as it is raised, a Y-mixer used to receive said at least one composition component from said at least one hose as they exit said filler tube; said components being combined in said Y-mixer.

2. The system to stabilize soil set forth in claim 1 wherein said composition includes a component combination of at least one type of resin, sand, a catalyst, cement grout and/or soil, a plurality of hoses housed within said filler tube are used to transport each component that makes up said composition, said Y-mixer used to receive different components from said plurality of hoses as they exit said filler tube, said components being combined in said Y-mixer.

3. The system to stabilize soil set forth in claim 2 wherein one composition component is used.

4. The system to stabilize soil set forth in claim 2 wherein two sensors are used to determine the reaction speed of said composition and its migration into the soil.

5. The system to stabilize soil set forth in claim 4, wherein one of the two sensors is a camera.

6. The system to stabilize soil set forth in claim 4 wherein data from said sensors is transmitted wired or wirelessly to a computerized station above the soil in real-time.

7. The system to stabilize soil set forth in claim 1 wherein said composition includes at least one type of resin, sand, said reaction-changing substance, cement grout and/or soil.

8. The system to stabilize soil set forth in claim 1 wherein said composition is a two-component formulation consisting essentially of two types of resin.

9. The system to stabilize soil set forth in claim 1 wherein said composition is combined with cement grout, soil, reaction-changing substance and/or sand.

10. The system to stabilize soil set forth in claim 9 wherein said reaction-changing substance can increase or decrease the amount of a composition reaction.

11. The system to stabilize soil set forth in claim 1 wherein said composition includes a component combination of at least one type of resin, sand, said reaction-changing substance, cement grout and/or soil, a plurality of hoses housed within said filler tube are used to transport each component that makes up said composition, a Y-mixer used to receive different components from said plurality of hoses as they exit said filler tube, said components being combined in said Y-mixer.

12. The system to stabilize soil set forth in claim 1 wherein said composition expands by 3% or less.

13. The system to stabilize soil set forth in claim 1 wherein said composition expands by more than 3%.

\* \* \* \* \*